United States Patent [19]
Candor

[11] 3,965,581
[45] June 29, 1976

[54] LIQUID REMOVING METHOD AND APPARATUS

[76] Inventor: James T. Candor, 5440 Cynthia Lane, Dayton, Ohio 45429

[22] Filed: Feb. 10, 1975

[21] Appl. No.: 548,666

Related U.S. Application Data

[63] Continuation-in-part of Ser. No. 469,820, May 14, 1974, and a continuation-in-part of Ser. No. 405,023, Oct. 10, 1973, and Ser. No. 499,178, Aug. 21, 1974, Pat. No. 3,893,898.

[52] U.S. Cl. .................................. 34/1; 34/18; 34/69; 34/164
[51] Int. Cl.² .......................... F26B 3/34; F26B 3/36
[58] Field of Search ................ 34/1, 17, 18, 69, 164

[56] References Cited
UNITED STATES PATENTS

| | | | |
|---|---|---|---|
| 2,344,754 | 3/1944 | Vang | 34/1 |
| 2,939,223 | 6/1960 | Smith | 34/152 |
| 2,960,777 | 11/1960 | Doll | 34/1 |
| 3,355,812 | 12/1967 | Bennett | 34/1 |
| 3,545,093 | 12/1970 | Forster | 34/164 |
| 3,641,680 | 2/1972 | Candor | 34/1 |
| 3,694,926 | 10/1972 | Rodwin | 34/69 |

*Primary Examiner*—John J. Camby
*Attorney, Agent, or Firm*—Candor, Candor & Tassone

[57] ABSTRACT

Apparatus and method for removing moisture from moisture bearing material comprising supporting structure for supporting the material, a vibrator unit for vibrating the supported material and an electrostatic unit for electrostatically removing moisture from the vibrating material and for dielectrically heating the vibrating material. The vibrator unit and the electrostatic unit are disposed in aligned relation substantially transverse to the supported material to respectively and substantially act in unison thereon.

20 Claims, 6 Drawing Figures

U.S. Patent  June 29, 1976  Sheet 1 of 2  3,965,581
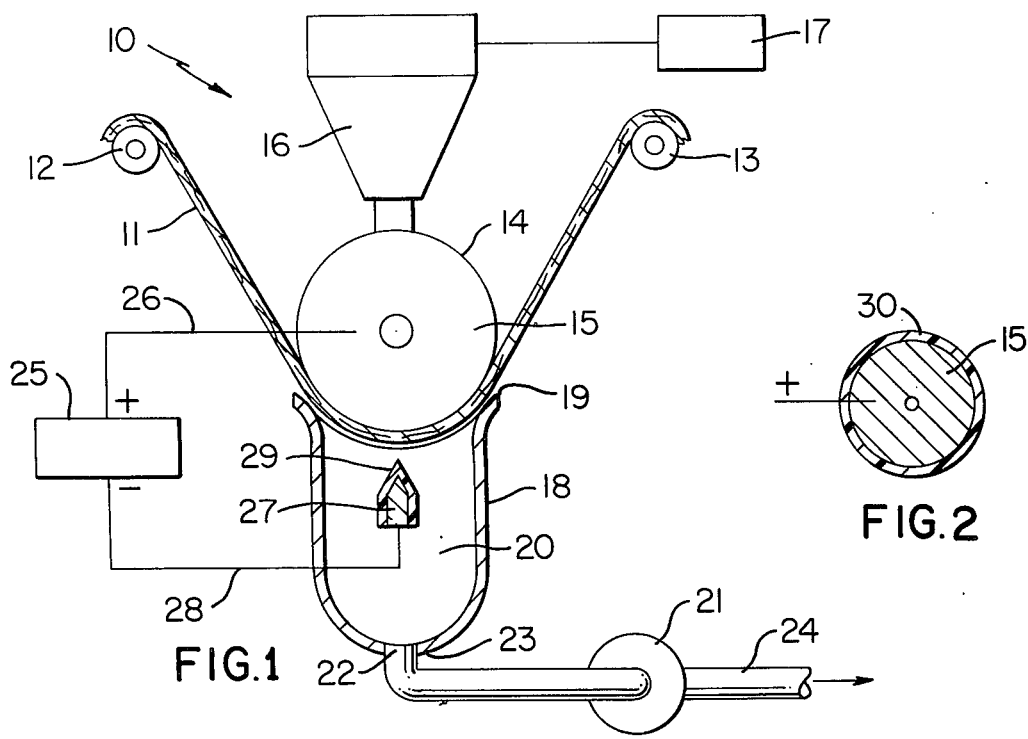
FIG.1
FIG.2
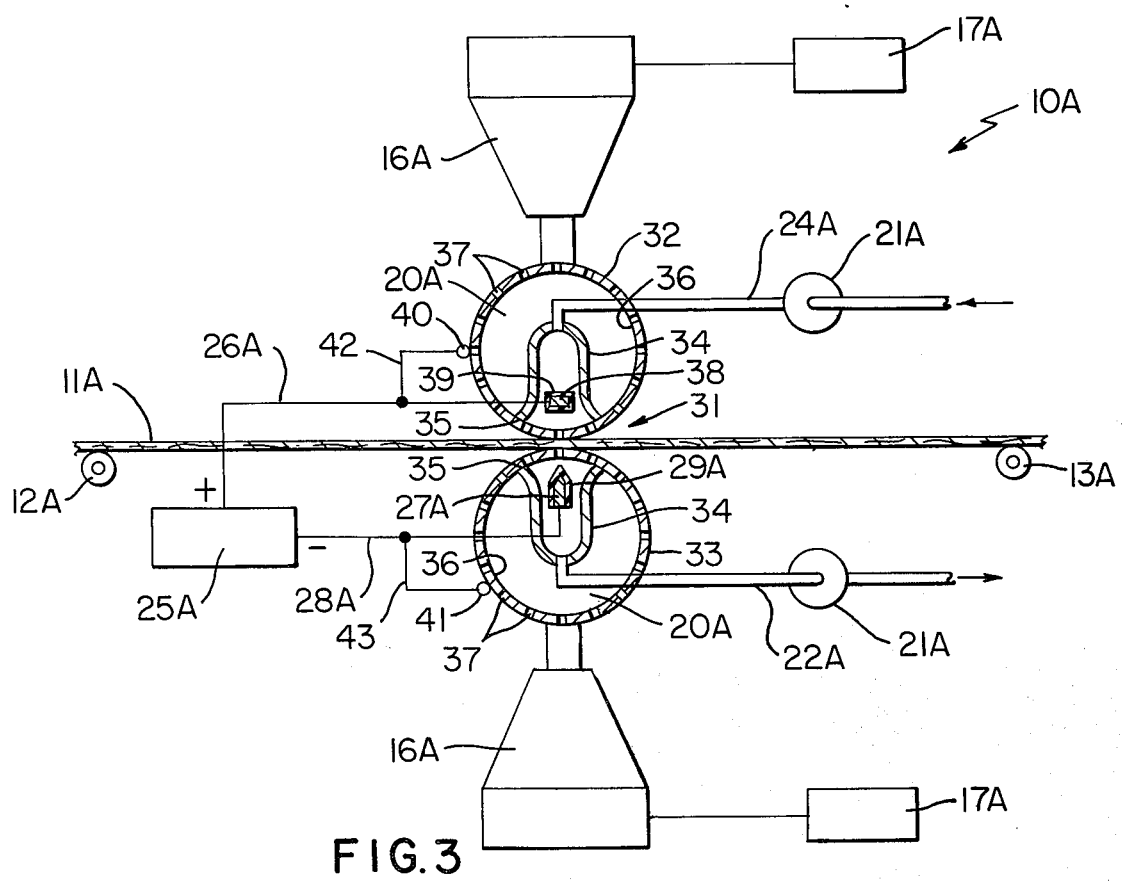
FIG.3

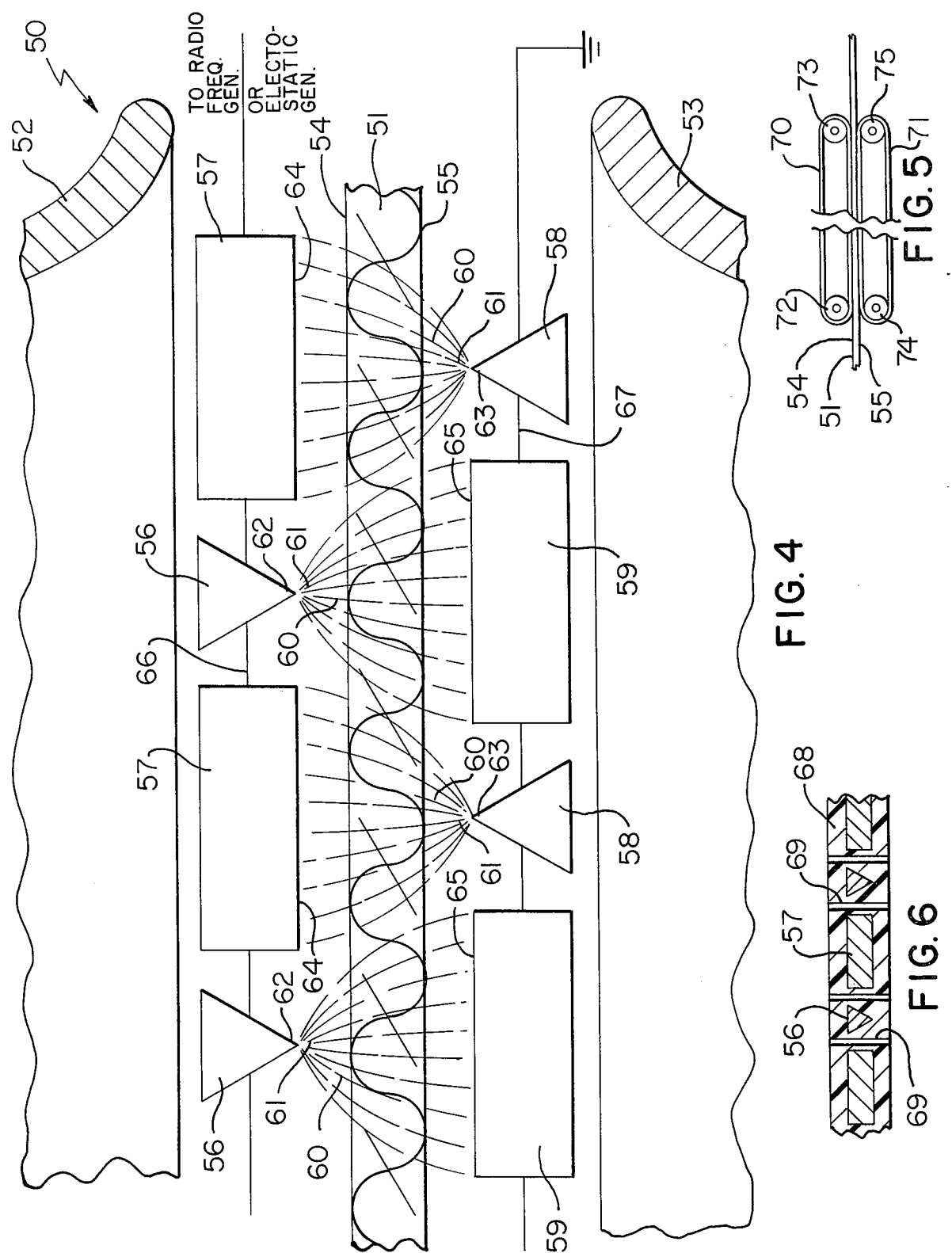

LIQUID REMOVING METHOD AND APPARATUS

This application is a Continuation-in-Part application of its copending parent application, Ser. No. 469,820, filed May 14, 1974, as well as a Continuation-in-Part application of copending Ser. No. 405,023, filed Oct. 10, 1973, and Ser. No. 499,178, filed Aug. 21, 1974, now U.S. Pat. No. 3,893,898.

This invention relates to an improved apparatus and method for removing moisture from moisture bearing material and the like.

It is well known from the U.S. patent to Candor et al., U.S. Pat. No. 3,641,680 that it has been suggested that the combination of vibrating action and electrostatic field action on the moisture of moisture bearing material will tend to remove such moisture from the moisture bearing material because it is believed that the vibrating action will tend to reduce the particle size of the moisture in the moisture bearing material to tend to reduce the capilliary holding action of the material on the moisture therein while the electrostatic field action will tend to sweep such reduced sized moisture particles from the moisture bearing material by an electro-osmotic action.

It is also well known that dielectric heating is utilized to remove moisture from moisture bearing material by passing the moisture bearing material through a high-intensity, high-frequency electric field such as is produced by a radio frequency generator.

In the case of dielectric heating wet fibrous webs, such as paper or pulp, it is well known, from an article in the December 1974 "Journal of the Technical Association of the Pulp and Paper Industry", Volume 5, No. 12 on page 134 and entitled, "An Updated Review of Dielectric Heating in the Paper, Pulp and Board Industries" by T. L. Wilson, that the dielectric heating of the web of material causes the moisture particles in the center portion of the web of material to rapidly turn to steam which explodes outwardly toward the opposed sides of the web of material and carries with it other particles of liquid water that are subsequently caught adjacent the opposed surfaces of the web of material by the more dense and hard surface layers thereof which are sufficiently porous to permit the passage of vapor, but not the moved particles of moisture.

It is believed, according to the teachings of this invention, that if the moisture particles in such web of material are reduced in size by a sonic or ultrasonic vibrating action, the dielectric heating process will be improved as the reduced size particles of moisture being swept along by the exploding central portion of steam in the web can more readily be pushed out through the denser outer layers of the web of material. Also, the dielectric heating acting on the reduced sized particles more rapidly heats up the same. Also, it is believed, according to the teachings of this invention, that if an electrostatic field action is also acting on the dielectric heated material, such electrostatic field action will assist the steam action in moving the moisture particles toward the outer layers of the web of material through the force of the electrostatic field action thereon and also will tend to remove the moisture from the outer surfaces or layers of the material for the reasons previously set forth.

Accordingly, it is a feature of this invention to provide an apparatus and method whereby the dielectric heating action and the vibrating action and/or the electrostatic field action can act in substantial unison on the moisture bearing material to remove the moisture thereof for the above reasons.

In particular, one embodiment of this invention provides means for supporting the moisture bearing material, vibrating means for vibrating the supported material and dielectric heating means for heating the moisture to remove at least some of the moisture from the vibrating material. In lieu of or in addition to the vibrating means, electrostatic means can be provided for electrostatically moving the moisture in the supported and heated material.

Accordingly, it is an object of this invention to provide an improved apparatus for removing moisture from moisture bearing material, the apparatus of this invention having one or more of the novel features set forth above or hereinafter shown or described.

Another object of this invention is to provide an improved method for removing moisture bearing material, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a schematic view, partially in cross section, illustrating one embodiment of the method and apparatus of this invention.

FIG. 2 is a cross-sectional view of another embodiment of a vibrating roller for the apparatus and method of FIG. 1.

FIG. 3 is a view similar to FIG. 1 and illustrates another embodiment of the method and apparatus of this invention.

FIG. 4 is an enlarged, fragmentary, cross-sectional view illustrating another embodiment of the method and apparatus of this invention.

FIG. 5 is a reduced schematic view illustrating a modification of the embodiment of FIG. 4.

FIG. 6 is a fragmentary cross-sectional view illustrating one of the belt means of the apparatus and method of FIG. 5.

While the various features of this invention are hereinafter described and illustrated as being particularly adapted to remove moisture from a wet paper web, it is to be understood that the various features of this invention can be utilized singly or in any combination thereof to act on other types of moisture bearing materials as desired.

Therefore, this invention is not to be limited to not only the embodiments illustrated in the drawings, because the drawings are merely utilized to illustrate one of the wide variety of uses of this invention.

Referring now to FIG. 1, one embodiment of the improved method and apparatus of this invention is generally indicated by the reference numeral 10 for acting on a wet web of material 11, such as a wet paper web as the same is being continuously formed in a paper making apparatus, a moist cloth material as the same is moving through a drying apparatus etc., suitably supported by roller means 12 and 13 to pass from left to right in FIG. 1 by itself or with a supporting screen or porous belt so as to pass around part of an external periphery 14 of a cylindrical conductive roller 15 that is adapted to be vibrated sonically or ultrasonically by conventional vibrating apparatus 16 suitably interconnected thereto and being supplied energy from an energy source 17 in a conventional manner.

In this manner, as the web of material 11 passes into engagement with the outer periphery 14 of the roller 15, the vibrating roller 15 rotates therewith and imparts vibrating action to the web of material 11 to tend to act on the moisture therein in a manner believed to tend to reduce the holding force of the fibers of the material 11 on the moisture contained therein, such as by reducing the particle size of the moisture contained in the material 11 through the vibration of such particles against the fibers of the web 11.

A stationary suction nozzle 18 is carried by the apparatus 10 and has an open end 19 disposed closely adjacent the roller 15 on the other side of the web 11 to tend to draw moisture from the material 11 into the interior 20 of the nozzle means 18 by a suction device 21 having an inlet conduit 22 thereof interconnected to the cavity 20 of the nozzle 18 at the bottom wall 23 of the nozzle 18 to tend to force moisture collected into the nozzle 18 out of an outlet conduit 24 of the suction means 21 for recovery purposes or exhaust thereof as the case may be.

In addition, an electrostatic field generating source means 25 is provided for the apparatus 10 and is adapted to charge the conductive roller 15 with a positive charge through a suitable lead means 26 while being adapted to charge a pointed, serrated or other desired shaped conductive electrode 27 with a negative charge through a suitable lead means 28, the electrode 27 being disposed in the cavity 20 of the nozzle 18 and pointing toward the roller 15 so as to create an electrostatic field action with the roller 15 whereby such electrostatic field tends to pass through the web of material 11 as the web 11 passes between the roller 15 and nozzle 18.

If desired, the electrode 27 can be covered with suitable insulating material 29 to prevent shorting thereof by the moisture being drawn into the inlet end 19 of the nozzle 18 or can be non-insulated and be a roller disposed in contact with the underside of the web 11 to impart its charge to the web 11.

Similarly, the roller 15 of the vibrating apparatus 16 can have its outer periphery covered with insulating material, such as the insulating material 30 illustrated in FIG. 2 while the interior of the roller is conductive and is provided with the positive charge from the source 25 by the lead 26.

In any event, it can be seen that the method and apparatus 10 of this invention has the vibrating means 15 and electrostatic means 27 disposed in aligned relation transverse to the material 11 to operate thereon in substantial unison in a manner now to be described.

As the web of material 11 continuously passes from left to right in FIG. 1 through the apparatus 10 by suitable drive means (not shown), a portion of the web of material 11 is always disposed in contact with a portion of the outer periphery 14 of the vibrating roller 15 whereby the vibrating roller 15 is believed to impart vibrating action to the engaged material 11 to tend to reduce the particle size of the moisture being contained therein and such reduced sized vibrating particles are believed to be adapted to be swept therefrom by the electrostatic field action created between the positively charged roller 15 and the negatively charged electrode 27 for the reason set forth in the aforementioned U.S. patent to Candor et al., U.S. Pat. No. 3,641,680 and/or any of the Candor et al. patents referred to therein.

In addition, a fluid flow is created in a direction toward the electrode 27 by the suction device 21 with such fluid flow passing through the material 11 to also tend to sweep such vibrating moisture particles therein into the cavity 20 of the nozzle 18 to be swept away by the suction device 21 out through the outlet conduit 24 whereby the fluid flow being created by the suction means 21 is also disposed transverse to the material 11 and in alignment with the vibrating means 15 and electrostatic means 27.

Thus, as each section of the material 11 passes against the roller 15, the same has the combined action of the vibrating means 15 and electrostatic field of electrode means 27, as well as the fluid flow action of the suction means 21, imposed thereon substantially simultaneously and in a direction transverse thereto to tend to sweep the moisture from that particular section of the material 11.

Accordingly, it is believed that the method and apparatus 10 of FIG. 1 will tend to remove moisture from the moisture bearing material 11 as the same passes between the roller 15 and nozzle 18 for the reasons previously set forth.

Another method and apparatus of this invention is generally indicated by the reference numeral 10A in FIG. 3 and parts thereof similar to the apparatus and method 10 previously described are indicated by like reference numerals followed by the reference letter A.

As illustrated in FIG. 3, the moisture bearing material 11A is supported by roller means 12A and 13A to pass from left to right in FIG. 3 through the apparatus 10A and is adapted to pass through a nip area 31 formed between a pair of perforated cylindrical rollers 32 and 33 respectively being adapted to be vibrated sonically or ultrasonically by vibrating apparatus 16A respectively interconnected thereto and interconnected to power source means 17A in a conventional manner whereby the rollers 32 and 33 are adapted to rotate as the material 11A passes therethrough and will impart vibrating action to the material 11A in the same manner as the roller 15 previously described.

However, each roller 32 and 33 has a stationary nozzle 34 disposed therein with the open end 35 of the respective nozzle 34 facing toward the material 11A and being disposed against the internal peripheral surface 26 of the respective roller 32 or 33 to be in fluid communication with perforations 37 passing through the respective roller 32 or 33 in the area of the moisture bearing material 11A passing through the nip area 31 thereof as illustrated.

Each nozzle 34 is interconnected to a suction device 21A except that the nozzle 34 for the upper roller 32 is interconnected to the outlet conduit 24A of its suction device 21A while the nozzle 34 of the lower roller 33 is interconnected to the inlet conduit 22A of its suction device 21A whereby fluid under pressure is adapted to be forced out of the nozzle means 34 of the upper roller 32 and into the material 11A at the open end 35 of its nozzle 34 while such fluid is adapted to be drawn into the open end 35 of the nozzle 34 of the lower roller 33 to thereby create a fluid flow directly through the material 11A in aligned relation with the vibrating rollers 32 and 33.

A voltage source 25A is provided for the apparatus and method 10A and is adapted to place a positive charge on an electrode 38 disposed in the chamber 20A of the upper nozzle 34 through a lead means 26A and place a negative charge on the electrode 27A disposed in the chamber 20A of the lower nozzle 34 by the lead means 28A, the upper electrode 38 and lower electrode 27A being respectively covered by insulating material 39 and 29A if desired and being of any desired shape for the intended function thereof.

Alternately or in addition to the electrodes 38 and 27A, the rollers 32 and 33 can be formed by conductive material and be respectively provided with a positive and negative charge through rolling contact means 40 and 41 respectively disposed in contact with the roller 32 and 33 and being interconnected to the leads 26A and 28A by branch leads 42 and 43.

In this manner, an electrostatic field action will be formed transverse to the material 11A between the rollers 32 and 33 either by the electrostatic field action being created between the electrodes 38 and 27A and/or by the electrostatic field action being created between the charged rollers 32 and 33 by the rolling contacts 40 and 41.

In any event, it can be seen that the apparatus and method 10A, in a manner similar to the apparatus 10, and method, has the vibrating means 32, 33; electrode means 38, 27A and/or 32, 33 and fluid moving means 34 of the rollers 32 and 33 disposed in aligned relation substantially transverse to the material 11A to operate in substantial unison thereon in a manner now to be described.

As the material 11A continuously passes from left to right in the apparatus and method 10A of FIG. 3, the vibrating rollers 32 and 33 act thereon to impart vibrating action to the section of material 11A disposed in the nip area 31 and engaging the rollers 32 and 33 whereby the vibrating material 11A is believed to cause the moisture particles therein to tend to be reduced in size and thereby have the force of the capillary holding action of the material 11A thereon reduced. The electrostatic field action being produced between the electrodes 38 and 27A and/or between the charged rollers 32 and 33 acts on such vibrating moisture particles to tend to sweep the same from the material 11A into the opening 35 of the lower nozzle 34 to be swept away from the interior 20A of the lower nozzle 34 through the lower suction device 21A. In addition, the fluid flow being created between the upper and lower nozzle means 34 of the rollers 32 and 33 in a direction down through the material 11A into the lower nozzle 34 also tends to sweep the vibrating moisture particles of the moisture bearing material 11A therefrom into the lower nozzle 34 to be removed therefrom by the suction device 21A in the manner previously described.

Therefore, it is believed that the method and apparatus 10A will tend to remove moisture from the moisture bearing material 11A as the same passes from left to right in the apparatus and method 10A through the combined action of the vibrating rollers 32, 33 and the electrostatic field produced by the electrodes 38, 27A and/or charged rollers 32 and 33 as well as by the fluid flow passing from the upper nozzle 34 with such actions all being transverse to the material 11A and in substantial aligned relation relative to each other while acting in unison on the material 11A.

While the electrostatic means of this invention has been described and illustrated as operating between oppositely charged electrodes, it is to be understood that such electrostatic field action can be created by a single electrode or between a pair of electrodes of which one thereof is grounded or at a like potential relative to another electrode but having a lesser positive or negative charge thereon as the case may be.

Also, the polarity of the electrodes illustrated in the drawings could be reversed, if desired.

While the vibrating means 15, 32 and 33 have each been illustrated and described as being a contact imparting vibrating means, it is to be understood that the vibrating means of this invention could comprise vibration means that impart sound waves against the web of material, whether such sound waves are audible or inaudible in much the same manner as set forth in the U.S. patent to Rodwin et al., U.S. Pat. No. 3,694,926, as it is believed that the electrostatic means, as well as the fluid directing means previously described, could be utilized in combination with such sound generating means.

Also, while an upper and lower roller means 32 and 33 are illustrated and described as jointly acting on the traveling web 11A, it is to be understood that the upper roller 32 and its associated structure could be eliminated whereby only the lower roller means 33 and its associated structure would be provided for acting on the material 11A to vibrate the same, create a fluid flow through the material 11A and to create an electrostatic field action on the material 11A whereby it can be seen that all three actions would all be disposed on the same side of the material 11A while being in alignment with each other and disposed substantially transversely to the material 11A. Of course, such lower roller means 33 when being utilized without the roller 32 and its associated structure could become an upper roller rather than a lower roller if desired. Also, when both rollers 32 and 33 are utilized, the same could be reversed so that roller 33 is an upper roller and roller 32 is a lower roller.

It is to be understood that while the rollers 32 and 33 are illustrated as merely contacting the web 11A in a non-compressing manner as the same passes through the nip area 31 thereof, the rollers 32 and 33 could also compress the web 11A as it passes therebetween to aid in the moisture removal from the web 11A in a manner similar to a press section of a conventional paper making machine.

Also, if only the roller 33 is utilized in the manner previously described, it is to be understood that the web 11A could pass around part of the same in the same manner as illustrated in FIG. 1 for the web 11 in order to increase the contact area between the roller 33 and the web 11A in a manner similar to a suction roll of a conventional paper making machine.

Another method and apparatus of this invention is generally indicated by the reference numeral 50 in FIG. 4 and is utilized for drying a wet web 51 of fibrous material as the same is passed from left to right through the apparatus 50, the method and apparatus 50 combining the use of vibrating action as caused by audible or inaudible sound producing horns 52 and 53 respectively disposed on opposite sides 54 and 55 of the web 51 with electrostatic means comprising a plurality of upper electrodes 56 and 57 disposed in aligned relation or row and a cooperating row of lower electrodes 58 and 59 in a manner hereinafter described whereby the upper and lower electrodes 56, 57 and 58, 59 cooperate therebetween to define a plurality of alternately arranged non-uniform electrostatic fields 60 each having the higher intensity portion 61 thereof substantially oppositely relative to the higher intensity portion 61 of the next adjacent field 60 as illustrated whereby the web of material 51 passes through the non-uniform fields 60 to be operated on in a manner hereinafter described. In addition, the electrodes 56–58 can be utilized to dielectrically heat the web 51 as the same passes therebetween in a manner hereinafter described.

The vibration producing horns 52 and 53 for the apparatus 50 can be of the type set forth in the aforementioned U.S. patent to Rodwin et al., U.S. Pat. No. 3,694,926, so that the sonic or ultrasonic sound waves thereof can pass through the spacing between the adjacent electrodes 56, 57 and 59, 58 to respectively impinge against the surfaces 54 and 55 of the web of material 51 to vibrate the same to tend to reduce the particle size of the moisture particles contained therein so that the reduced sized moisture particles can be more readily swept away by the electrostatic fields 60 as well as be more readily heated up through the dielectric heating action of the elctrodes 56–59.

The electrodes 56 of the upper row of electrodes and the electrodes 58 of the lower row of electrodes are substantially pointed at the ends 62 and 63 thereof which respectively face toward the sides 54 and 55 of the web 51 while the upper and lower electrodes 57 and 59 are relatively wide and flat so as to respectively present flat surfaces 64 and 65 substantially opposite the pointed ends 63 and 62 of the smaller electrodes 56 and 58 with such electrodes 56–59 respectively extending completely laterally across the width of the web 51 of material so that the non-uniform fields 60 formed between each cooperating pair of electrodes 56, 59 and 57, 58 extends the entire width of the web 51 of material to act on the moisture particles therein to tend to move the same respectively toward the more intense portions 61 of the respective fields 60 as well as to tend to remove the moisture particles adjacent the surfaces 54 and 55 toward the points 62 and 63 of the smaller electrodes 56 and 58 for the reasons fully set forth in the patent to Candor, U.S. Pat. No. 3,849,275, wherein the use of alternately arranged non-uniform electrostatic fields are disclosed and claimed.

The upper row of electrodes 56 and 57 are respectively electrically interconnected together by conductor means 66 so as to all be interconnected to a radio frequency generator (not shown) while the lower row of electrodes 58 and 59 are adapted to be electrically interconnected together by a conductor 67 to ground and/or to the opposite terminal of the generator whereby the operation of the radio frequency generator will cause the upper electrodes 56, 57 to rapidly have the polarity thereof reversed (as well as the lower electrodes 58 and 59 through induction) so that the resulting high intensity, high frequency electric fields 60 will cause the moisture particles in the material 51 to heat up dielectrically and change some of the same into steam to be expelled out of the opposed sides 54 and 55 of the web 51 in the manner well known in the art of dielectric heating.

Alternately, the conductors 66 and 67 for the electrodes 56–59 can be interconnected to an electrostatic generator to produce constant non-uniform electrostatic fields 60 to cooperate with the vibrating means 52 and 53 in the manner previously described except that the non-uniform fields 60 will tend to move the moisture particles more readily toward the higher intensity portions 61 of the fields 60 thereof through the phenomenon known as "dielectrophoresis".

The operation of the method and apparatus 50 of FIG. 4 will now be described.

As the wet web 51 of fibrous material passes from left to right through the apparatus 50, the dielectric heating of the particles thereon occurs through the action of the high frequency, high intensity fields 60 thereon whereby there is a tendency for the dielectrically heated moisture particles in the central portion of the web 51 to heat up more rapidly than the particles adjacent to the outer surface thereof so that as the central moisture particles are changed to vapor, the rapidly expanding steam explodes outwardly toward the outer surfaces 54 and 55 of the web of material 51 and tends to entrain the other moisture particles therewith except that such other moisture particles are trapped in the outer and more dense layers of the fibrous material 51 adjacent the outer surfaces 54 and 55 thereof. Such effect of moving moisture particles to the outer areas of the surfaces 54 and 55 of the web 51 is described as a "bonus effect" of dielectric heating in the aforementioned article of the "Journal of the Technical Association of the Pulp and Paper Industry" as the web of material 51 is to be subsequently further dried by being moved into contact with heated cylinders known as "cans" which further evaporate the moisture therein through a high heating thereof.

However, it is believed that the vibration of the web 51 by the horns 52 and 53 producing audible or inaudible sound waves that pass between the electrodes 56, 57 and 58, 59 and impinge against the surfaces 54 and 55 of the web 51 will reduce the moisture particles size in the web 51 so that not only do the central particles more rapidly heat up through the aforementioned dielectric heating thereof, but also the moisture particles that are entrained in the resulting exploding steam of the vaporized moisture particles are more readily forced through the denser parts of the outer portions of the web material 51 adjacent the surfaces 54 and 55 thereof to be expelled out of the same. Also, because the particles in the web 51 have been reduced in size by the vibration of the web 51, those particles closer to the outer surfaces 54 and 55 are more readily heated up dielectrically because of the size thereof having been reduced. Further, because of the non-uniform shape of the fields 60, the fields 60 themselves tend to move the moisture particles toward the more intense portions 61 thereof so that for a moisture particle above the center line of the web of material 51, every other field 60 will tend to move that moisture particle closer to the upper surface 54 by the phenomenon of "dielectrophoresis" whereas the reverse facing non-uniform fields 60 have negible effect thereon because particles in the upper portion of the web 51 are more influenced by the more intense portions 61 of the field 60 than the less intense portions thereof. Conversely, moisture particles in the web of material 51 below the center line thereof are more influenced by the downwardly directed intensive portions 61 of the fields 60 so that the moisture particles are moved toward the lower surface 55 by such fields.

Therefore, it is believed, that by combining the effects of dielectric heating, vibration and electrostatic field action on the moisture particles in the web 51 as the same passes from left to right through the apparatus 50, the web 51 will have the moisture thereof more rapidly removed than if only dielectric heating thereof takes place, only vibration thereof takes place or only electrostatic field action takes place thereon. However, it is to be understood that the dielectric field action can take place with just the vibrating action produced by the horns 52 and 53 or other vibration producing means or the dielectric heating action can take place with just the addition of the non-uniform electrostatic field effect previously described.

If desired, the upper row of electrodes 56, 57 and lower row of electrodes 58, 59 could each be encased in an insulating material 68 in the manner illustrated in FIG. 6 so that no shorting or arcing across the web of material 51 can take place, the insulating material 68 having suitable holes 69 passing therethrough between the ajacent electrodes therein as well as perhaps even passing through the larger electrodes as desired whereby not only can the sound waves pass through the holes 69 to impinge against the material 51, but also the ejected steam from the web 51 of material can pass out through the openings 69.

Further, the insulating material 68 could be so flexible so that the same can form an endless belt arrangement such as illustrated in FIG. 5 wherein two electrode belts 70 and 71 are respectively looped around rollers 72, 73, 74 and 75 so that the web of material 51 can have its opposed sides 54 and 55 respectively disposed in contact with the adjacent runs of the upper and lower belts 70 and 71 to move in unison therewith from left to right whereby the electrodes will perform the dielectric heating function as well as the electrostatic attracting function in the manner previously described and as set forth in the aforementioned U.S. patent application, Ser. No. 405,023. Of course, vibration of the web 51 can also take place between the belts 70 and 71 for the reasons previously set forth, such as by vibrating one or both belts 70 and 71 to thereby vibrate the wet web 51 therebetween.

Therefore, it can be seen that the vibrating action and/or the electrostatic action causes the moisture particles to more readily move to the outer layers of the web of material 51 during the dielectric heating operation as well as remove the same from the outer layers through the smaller sized particles either being more readily vaporized by the dielectric heating thereof, more readily being blown out by the escaping steam because the same are smaller in size through the vibration thereof, or more readily drawn out of the outer layers thereof through the force of the electrostatic field action thereon.

Therefore, it can be seen that this invention not only provides an improved apparatus for removing moisture from moisture bearing material, but also this invention provides an improved method of removing moisture from moisture bearing material.

While the form and method of this invention now preferred have been described and illustrated as required by the Patent Statute, it is to be understood that other forms and method steps can be utilized and still come within the scope of the appended claims.

What is claimed is:

1. Apparatus for removing moisture from web-like moisture bearing fibrous material comprising means for supporting and moving said material in strip-like fashion, vibrating means for vibrating said moving and supported material to work the fibers thereof, and dielectric heating means for heating said moisture in said moving and supported and vibrating material to remove at least some of said moisture from said vibrating material.

2. Apparatus as set forth in claim 1 and including electrostatic means for electrostatically moving said moisture in said vibrating material.

3. Apparatus as set forth in claim 2 wherein said dielectric heating means and said electrostatic means are the same means.

4. Apparatus as set forth in claim 2 wherein said electrostatic means moves said moisture in said vibrating material toward each opposed side thereof.

5. Apparatus as set forth in claim 2 wherein said electrostatic means also removes at least some of said moisture from said vibrating material.

6. A method for removing moisture from web-like moisture bearing fibrous material comprising the steps of supporting and moving said material in strip-like fashion, vibrating said supported and moving material with vibrating means to work the fibers thereof, and removing at least some of said moisture from said vibrating material with dielectric heating means dielectrically heating said moisture in said vibrating material while said material is being moved and supported.

7. A method as set forth in claim 6 and including the step of electrostatically moving said moisture in said vibrating material with electrostatic means.

8. A method as set forth in claim 7 wherein said dielectric heating means and said electrostatic means are the same means.

9. A method as set forth in claim 7 wherein said step of electrostatically moving said moisture in said material comprises the step of electrostatically moving said moisture in said vibrating material toward each opposed side thereof.

10. A method as set forth in claim 7 wherein said step of electrostatically moving said moisture in said material includes the step of electrostatically removing at least some of said moisture from said vibrating material.

11. Apparatus for removing moisture from web-like moisture bearing fibrous material comprising means for supporting and moving said material in strip-like fashion, dielectric heating means for heating said moisture to remove said moisture from said supported and moving material, and electrostatic means disposed adjacent said supported and moving material for electrostatically moving said moisture in said supported and moving and heated material toward said electrostatic means through the electrostatic attraction between said moisture and said electrostatic means.

12. Apparatus as set forth in claim 11 wherein said dielectric heating means and said electrostatic means are the same means.

13. Apparatus as set forth in claim 11 wherein said electrostatic means moves said moisture in said supported material toward each opposed side thereof.

14. Apparatus as set forth in claim 11 wherein said electrostatic means also removes at least some of said moisture from said supported and heated material.

15. Apparatus as set forth in claim 11 wherein said electrostatic means defines a plurality of alternately arranged non-uniform electrostatic fields in which said supported material is disposed, each field having its higher intensity portion substantially oppositely located relative to the higher intensity portion of a field adjacent thereto.

16. A method for removing moisture from web-like moisture bearing fibrous material comprising the steps of supporting and moving said material in strip-like fashion, removing at least some of said moisture from said vibrating material with dielectric heating means dielectrically heating said moisture in said supported and moving material, and electrostatically moving said moisture in said supported and moving and heated material with electrostatic means that is disposed adjacent said supported and moving material and which attracts said moisture toward the same through the electrostatic attraction between said moisture and said electrostatic means.

17. A method as set forth in claim 16 wherein said dielectric heating means and said electrostatic means are the same means.

18. A method as set forth in claim 16 wherein said step of electrostatically moving said moisture in said material comprises the step of electrostatically moving said moisture in said heated material toward each opposed side thereof.

19. A method as set forth in claim 16 wherein said step of electrostatically moving said moisture in said material includes the step of electrostatically removing at least some of said moisture from said supported and heated material.

20. A method as set forth in claim 16 wherein said step of electrostatically moving said moisture in said material comprises the step of forming a plurality of alternately arranged non-uniform electrostatic fields in which said supported material is disposed and with each field having its higher intensity portion substantially oppositely located relative to the higher intensity portion of a field adjacent thereto.

* * * * *